US009606280B2

(12) United States Patent
Chang

(10) Patent No.: US 9,606,280 B2
(45) Date of Patent: Mar. 28, 2017

(54) METHOD FOR MANUFACTURING A REFLECTIVE OPTICAL FILM

(71) Applicant: EXTEND OPTRONICS CORP., Taoyuan County (TW)

(72) Inventor: Jen-Huai Chang, Taoyuan County (TW)

(73) Assignee: EXTEND OPTRONICS CORP., Taoyuan County (TW)

(*) Notice: Subject to any disclaimer, the term of this patent is extended or adjusted under 35 U.S.C. 154(b) by 0 days.

(21) Appl. No.: 15/143,564

(22) Filed: Apr. 30, 2016

(65) Prior Publication Data

US 2016/0245971 A1  Aug. 25, 2016

Related U.S. Application Data

(63) Continuation-in-part of application No. 13/479,346, filed on May 24, 2012, now abandoned.

(51) Int. Cl.
*G02B 5/30* (2006.01)
*B29C 55/02* (2006.01)
(Continued)

(52) U.S. Cl.
CPC ............ *G02B 5/305* (2013.01); *B29C 47/707* (2013.01); *B29C 55/023* (2013.01); *B29C 70/64* (2013.01); *B29D 11/0073* (2013.01); *B29D 11/00644* (2013.01); *G02B 5/0242* (2013.01); *G02B 5/0841* (2013.01); *G02B 5/3008* (2013.01); *G02B 5/3083* (2013.01); *G02F 1/133536* (2013.01); *G02F 1/133634* (2013.01);
(Continued)

(58) Field of Classification Search
CPC .... G02B 5/0226; G02B 5/0242; G02B 5/305; G02B 5/3083; G02B 5/3008; B29C 47/0021; B29C 47/065; B29C 55/023; B29C 47/707; B29D 11/00644; B29D 11/0073; B29D 11/00798
USPC ............ 359/489.01, 489.12, 489.13, 489.15, 359/489.19, 599, 900; 264/1.34, 1.7, 264/172.13, 172.16
See application file for complete search history.

(56) References Cited

U.S. PATENT DOCUMENTS 5,262,894 A * 11/1993 Wheatley ................... B32B 7/02
359/586
5,269,995 A * 12/1993 Ramanathan ........... B29C 47/56
264/173.12
(Continued)

*Primary Examiner* — Ricky D Shafer
(74) *Attorney, Agent, or Firm* — Li & Cai Intellectual Property (USA) Office

(57) ABSTRACT

A reflective optical film includes a reflective light-polarizing unit including a multilayer reflective sheet composed of a plurality of polymer films stacked on top of one another. Each polymer film has a thickness, every two adjacent polymer films are two different materials, and the thicknesses of the polymer films are gradually decreased from two outmost sides of the multilayer reflective sheet to a middle of the multilayer reflective sheet. At least one of the polymer films is a birefringence material layer that conforms to the condition of NX≠NY≠NZ, where NX is the index of refraction of light at X direction of the multilayer reflective sheet, NY is the index of refraction of light at Y direction of the multilayer reflective sheet, and NZ is the index of refraction of light at Z direction of the multilayer reflective sheet.

9 Claims, 19 Drawing Sheets

(51) Int. Cl.
  *B29D 11/00* (2006.01)
  *G02B 5/08* (2006.01)
  *G02B 5/02* (2006.01)
  *G02F 1/1335* (2006.01)
  *G02F 1/13363* (2006.01)
  *B29C 70/64* (2006.01)
  *B29C 47/70* (2006.01)
  *B29C 47/06* (2006.01)
  *B29C 47/00* (2006.01)
  *B29K 67/00* (2006.01)
  *B29K 105/16* (2006.01)
  *B29C 47/56* (2006.01)

(52) U.S. Cl.
  CPC ........ *B29C 47/004* (2013.01); *B29C 47/0021* (2013.01); *B29C 47/065* (2013.01); *B29C 47/56* (2013.01); *B29C 2947/92285* (2013.01); *B29C 2947/92438* (2013.01); *B29D 11/00596* (2013.01); *B29D 11/00798* (2013.01); *B29K 2067/00* (2013.01); *B29K 2067/003* (2013.01); *B29K 2105/16* (2013.01); *B29K 2995/003* (2013.01); *B29K 2995/0032* (2013.01); *G02F 2001/133545* (2013.01)

(56) References Cited

U.S. PATENT DOCUMENTS

| | | | | |
|---|---|---|---|---|
| 6,024,455 | A * | 2/2000 | O'Neill | G02B 5/124 283/85 |
| 6,045,894 | A * | 4/2000 | Jonza | B32B 27/36 428/141 |
| 6,049,419 | A * | 4/2000 | Wheatley | B32B 17/10018 359/359 |
| 6,565,982 | B1 * | 5/2003 | Ouderkirk | B32B 17/10018 359/584 |
| 6,830,713 | B2 * | 12/2004 | Hebrink | B29C 47/0021 264/1.6 |
| 7,773,834 | B2 * | 8/2010 | Ouderkirk | G02B 5/3008 385/11 |
| 2008/0113113 | A1 * | 5/2008 | Moon | B32B 7/02 428/1.1 |
| 2010/0165660 | A1 * | 7/2010 | Weber | G02B 5/305 362/609 |
| 2011/0222295 | A1 * | 9/2011 | Weber | B32B 7/02 362/296.01 |
| 2011/0272832 | A1 * | 11/2011 | Neavin | B29C 47/0021 264/1.7 |
| 2013/0094085 | A1 * | 4/2013 | Merrill | G02B 5/3083 359/489.07 |

* cited by examiner

1

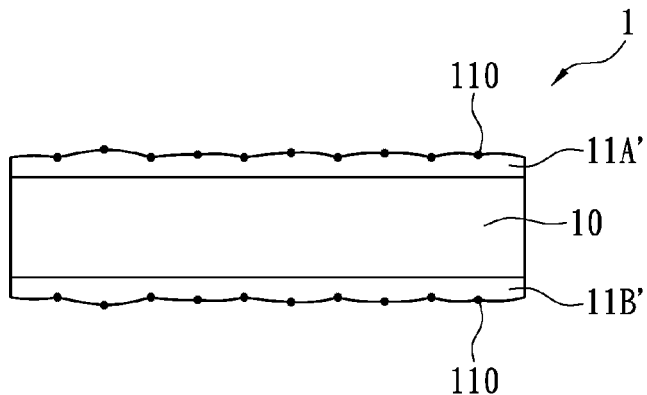

FIG. 5A forming a multilayer reflective sheet composed of a plurality of polymer films stacked on top of one another by a co-extrusion process, wherein the thicknesses of the polymer films are gradually decreased from two outmost sides of the multilayer reflective sheet to a middle of the multilayer reflective sheet, at least one of the polymer films is a birefringence material layer that can conform to the condition of NX≠NY≠NZ, wherein NX is the index of refraction of light at X direction of the multilayer reflective sheet, NY is the index of refraction of light at Y direction of the multilayer reflective sheet, and NZ is the index of refraction of light at Z direction of the multilayer reflective sheet —S500 extending the multilayer reflective sheet —S502 respectively forming two surface structures on two opposite outside surfaces of the multilayer reflective sheet, wherein each surface structure has a plurality of diffusion particles distributed therein —S504

FIG. 5B

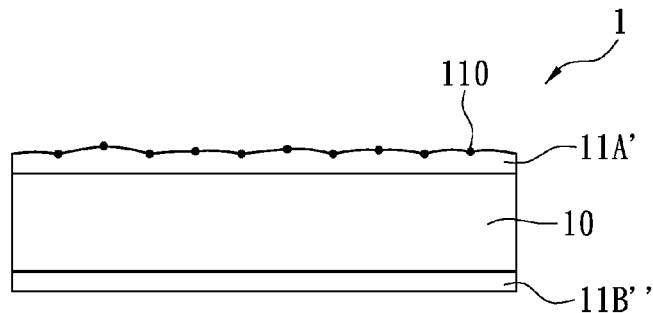

FIG. 6A forming a multilayer reflective sheet composed of a plurality of polymer films stacked on top of one another by a co-extrusion process, wherein the thicknesses of the polymer films are gradually decreased from two outmost sides of the multilayer reflective sheet to a middle of the multilayer reflective sheet, at least one of the polymer films is a birefringence material layer that can conform to the condition of NX≠NY≠NZ, wherein NX is the index of refraction of light at X direction of the multilayer reflective sheet, NY is the index of refraction of light at Y direction of the multilayer reflective sheet, and NZ is the index of refraction of light at Z direction of the multilayer reflective sheet ——S600 extending the multilayer reflective sheet ——S602 forming a surface structure on an outside surface of the multilayer reflective sheet and forming a diffusion film on another outside surface of the multilayer reflective sheet, wherein the surface structure has a plurality of diffusion particles distributed therein ——S604

FIG. 6B

METHOD FOR MANUFACTURING A REFLECTIVE OPTICAL FILM

CROSS REFERENCE TO RELATED APPLICATIONS

This application is a continuation-in-part of U.S. application Ser. No. 13/479,346 filed on May 24, 2012, and entitled "REFLECTIVE OPTICAL FILM AND METHOD OF MANUFACTURING THE SAME, AND IMAGE DISPLAY DEVICE", now pending, the entire disclosures of which are incorporated herein by reference.

BACKGROUND OF THE INVENTION

1. Field of the Invention

The instant disclosure relates to a method for manufacturing a reflective optical film, and more particularly, to a method for manufacturing a reflective optical film having a thickness gradient variation.

2. Description of Related Art

Polymeric optical films are used in a wide variety of applications such as reflective polarizers. Such reflective polarizer films are used, for example, in conjunction with backlights in liquid crystal displays. A reflective polarizing film can be placed between the user and the backlight to recycle polarized light that would be otherwise absorbed, and thereby increasing brightness. These polymeric optical films often have high reflectivity, while being lightweight and resistant to breakage. Thus, the films are suited for use as reflectors and polarizers in compact electronic displays, such as liquid crystal displays (LCDs) placed in mobile telephones, personal data assistants, portable computers, desktop monitors, and televisions, for example. In commercial processes, optical films made from polymeric materials or blends of materials are typically extruded from a die using a feedblock or cast from solvent. The extruded or cast film is then stretched to create and/or enhance birefringence in at least some of the materials. The materials and the stretching protocol may be selected to produce an optical film such as a reflective optical film, for example, a reflective polarizer or a mirror.

SUMMARY OF THE INVENTION

One aspect of the instant disclosure relates to a reflective optical film having a thickness gradient variation.

Another one aspect of the instant disclosure relates to a method of manufacturing a reflective optical film having a thickness gradient variation.

Yet another one aspect of the instant disclosure relates to an image display device using a reflective optical film having a thickness gradient variation.

One of the embodiments of the instant disclosure provides method of manufacturing a reflective optical film, comprising: feeding materials to a feedblock multiplier with thickness-gradient variation, wherein the feedblock multiplier includes a feedblock section, a plurality of channels, a segmenting section, at least two channel-switching sections, a multiplier section, and an extruding section; transporting the materials to the feedblock section for splitting the materials into a plurality of fluids over the channels; transporting the fluids over the channels to the segmenting section defining a bevel or a curved cross section configured to define the multiple of layers and render the thickness-gradient variation, and segmenting the fluids over the channels into at least two fluid segments by the bevel or the curved cross section of the segmenting section, wherein each fluid segment includes fluids segmented over the plurality of channels; respectively flowing the at least two fluid segments over the at least two channel-switching sections for combining the at least two fluid segments in the multiplier section, wherein the at least two channel-switching sections are used to switch the relative transportation position of the channels in each channel-switching section, and the thicknesses of the channels over the channel-switching sections have gradient variation; stacking up the fluids over the channels comprised in each fluid segment at the multiplier section; outputting the fluids over the channels stacked at the multiplier section at the extruding section for producing a multilayer reflective sheet, wherein the multilayer reflective sheet is composed of a plurality of polymer films stacked on top of one another and each polymer film has a thickness, every two adjacent polymer films are two different materials, the thicknesses of the polymer films are gradually decreased from two outmost sides of the multilayer reflective sheet to a middle of the multilayer reflective sheet, at least one of the polymer films is a birefringence material layer that conforms to the condition of NX≠NY≠NZ, wherein NX is the index of refraction of light at X direction of the multilayer reflective sheet, NY is the index of refraction of light at Y direction of the multilayer reflective sheet, and NZ is the index of refraction of light at Z direction of the multilayer reflective sheet; and extending the multilayer reflective sheet.

In conclusion, because the thicknesses of the polymer films are gradually decreased from the two outmost sides of the multilayer reflective sheet to the middle of the multilayer reflective sheet, the shearing force can be reduced and the fluid velocity and the fluid pressure in the flow channel can be balanced during the co-extrusion process of manufacturing the multilayer reflective sheet.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

BRIEF DESCRIPTION OF THE DRAWINGS

FIG. 5A shows a lateral, schematic view of the reflective optical film according to the fifth embodiment of the instant disclosure;

FIG. 5B shows a flowchart of the method of manufacturing the reflective optical film according to the fifth embodiment of the instant disclosure;

FIG. 6A shows a lateral, schematic view of the reflective optical film according to the sixth embodiment of the instant disclosure;

FIG. 6B shows a flowchart of the method of manufacturing the reflective optical film according to the sixth embodiment of the instant disclosure;

DETAILED DESCRIPTION OF THE PREFERRED EMBODIMENTS

First Embodiment

Figure 1A:
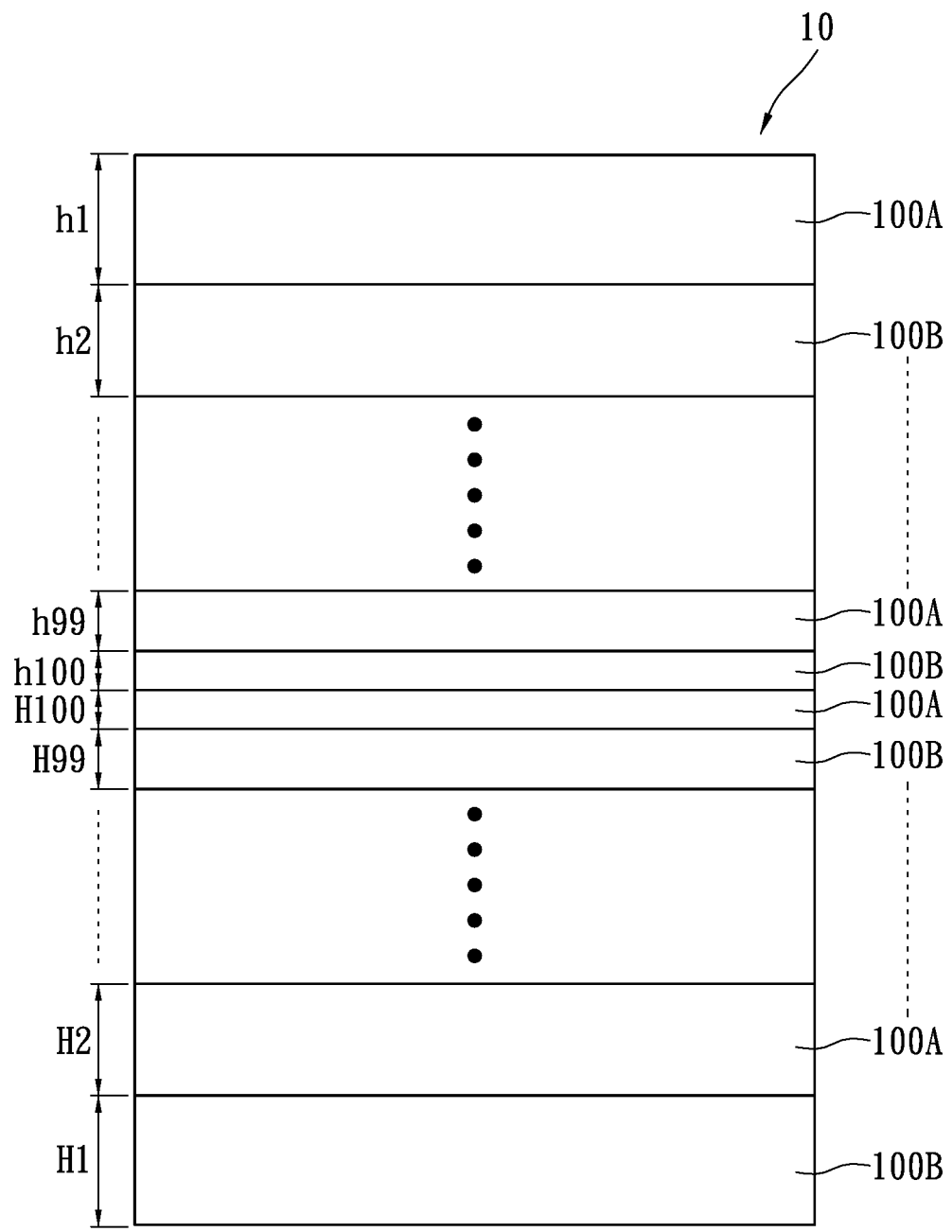
FIG. 1A shows a lateral, schematic view of the multilayer reflective sheet according to the instant disclosure.
Figure 1B:
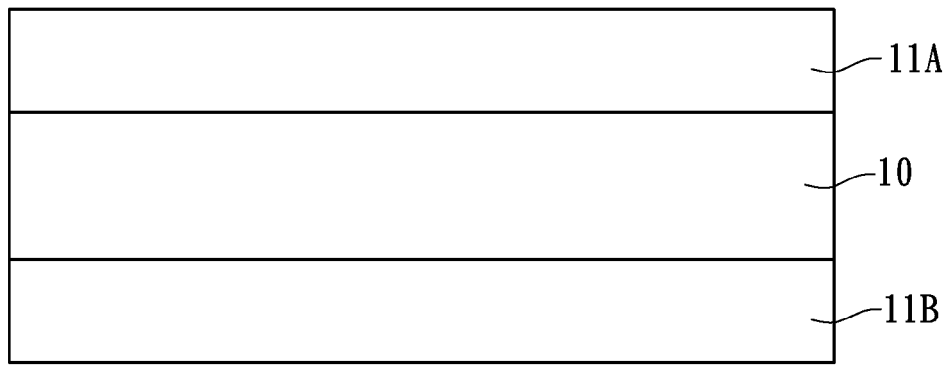
FIG. 1B shows a lateral, schematic view of the reflective optical film according to the first embodiment of the instant disclosure.
Figure 1C:
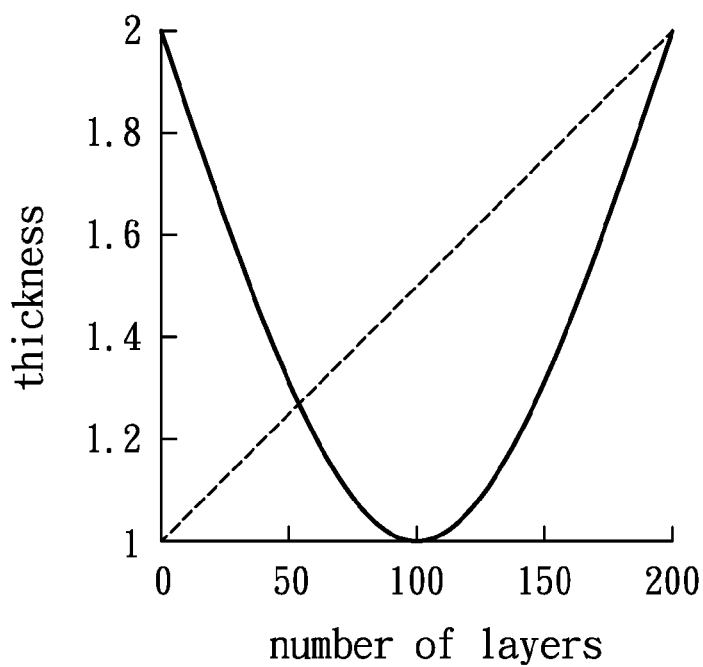
FIG. 1C shows a curve schematic diagram of different layers of the multilayer reflective sheet corresponding to different thicknesses (such as μm)

Referring to FIG. 1A to FIG. 1C, the first embodiment of the instant disclosure provides a reflective optical film comprising a reflective light-polarizing unit 1 that includes a multilayer reflective sheet 10 composed of a plurality of polymer films (100A, 100B) stacked on top of one another, a first functional layer 11A and a second functional layer 11B. Each polymer film (100A or 100B) has a thickness, every two adjacent polymer films (100A, 100B) are two different materials or made of two different materials, and the thicknesses of the polymer films (100A, 100B) are gradually decreased from two outmost sides of the multilayer reflective sheet 10 to a middle of the multilayer reflective sheet 10 (as shown in FIG. 1A). The multilayer reflective sheet 10 can be manufactured to form a symmetrical thickness structure by mating feedblocks and multipliers, thus the fluid velocity and the fluid pressure in the flow channels of the feedblock can be balance due to the symmetrical thickness structure. Of course, the thicknesses of the polymer films (100A, 100B) also can be gradually increased from two the outmost sides of the multilayer reflective sheet 10 to the middle of the multilayer reflective sheet 10, thus the fluid pressure and the fluid velocity in the flow channel of the feedblock also can be balanced. In addition, at least one of the polymer films (100A, 100B) is a birefringence material layer that can conform to the condition of NX≠NY≠NZ, wherein NX is the index of refraction of light at X direction of the multilayer reflective sheet 10, NY is the index of refraction of light at Y direction of the multilayer reflective sheet 10, and NZ is the index of refraction of light at Z direction of the multilayer reflective sheet 10. Moreover, referring to FIG. 1B, the first functional layer 11A and the second functional layer 11B are respectively disposed on a first surface and a second surface of the multilayer reflective sheet 10. For example, the first functional layer 11A and the second functional layer 11B may be a metal oxide layer or an ultraviolet absorbing layer.

For example, referring to FIG. 1A, the multilayer reflective sheet 10 can be composed of 200 polymer films (100A, 100B) stacked on top of one another, and the polymer films (100A, 100B) have different thicknesses (H1, H2, . . . , H99, H100; h1, h2, . . . , h99, and h100). Hence, the thicknesses (H1~H100) of 100 polymer films (100A, 100B) can be gradually decreased from one outmost side of the multilayer reflective sheet 10 to the middle of the multilayer reflective sheet 10, and the thicknesses (h1~h100) of another 100 polymer films (100A, 100B) can be gradually decreased from another outmost side of the multilayer reflective sheet 10 to the middle of the multilayer reflective sheet 10, thus the thicknesses (H1~H100) and the thicknesses (h1~h100) can be shown as a symmetrical thickness structure. In other words, the thicknesses of the 200 polymer films (100A, 100B) can be shown as a gradient variation.

In addition, referring to FIG. 1C, the thicknesses of the 200 polymer films (100A, 100B) can be shown as a U-shaped curve alteration (such as the solid line in FIG. 1C), but the thicknesses of the conventional polymer films can be shown as an inclined line alteration (such as the dotted line in FIG. 1C). Of course, the thicknesses of the 200 polymer films (100A, 100B) also can be shown as an inverted U-shaped curve alteration in order to balance the fluid pressure and the fluid velocity in the flow channel of the mold. However, the thicknesses H1 and h1 can be the same or different, and the materials for manufacturing the thicknesses H1 and h1 can be the same or different. In addition, the thicknesses H100 and h100 also can be the same or different, and the materials for manufacturing the thicknesses H100 and h100 also can be the same or different. Referring to FIG. 1M, the semicircle feedblock 40 includes a plurality of flow channels (41~48), where the flow channels (41, 42) are symmetrical to the flow channels (47, 48), and the flow channels (43, 44) are symmetrical to the flow channels (45, 46). In addition, the widths of the flow channels are gradually decreased from the flow channel 41 to the flow channel 44, and the flow channel 41 and the flow channel 42 are adjacent to each other and made by two different materials. After the fluid passes through the flow channels (41~48) and be converged toward the general flow channel 49, the fluid can be outputted from the general flow channel 49. Furthermore, the instant disclosure can use a multiplier to connect two feedblocks 40 in order to increase the number of the polymer films such as the 200 polymer films (200 layers of the multilayer reflective sheet 10) as shown in FIG. 1A and FIG. 1C.

Figure 1D:
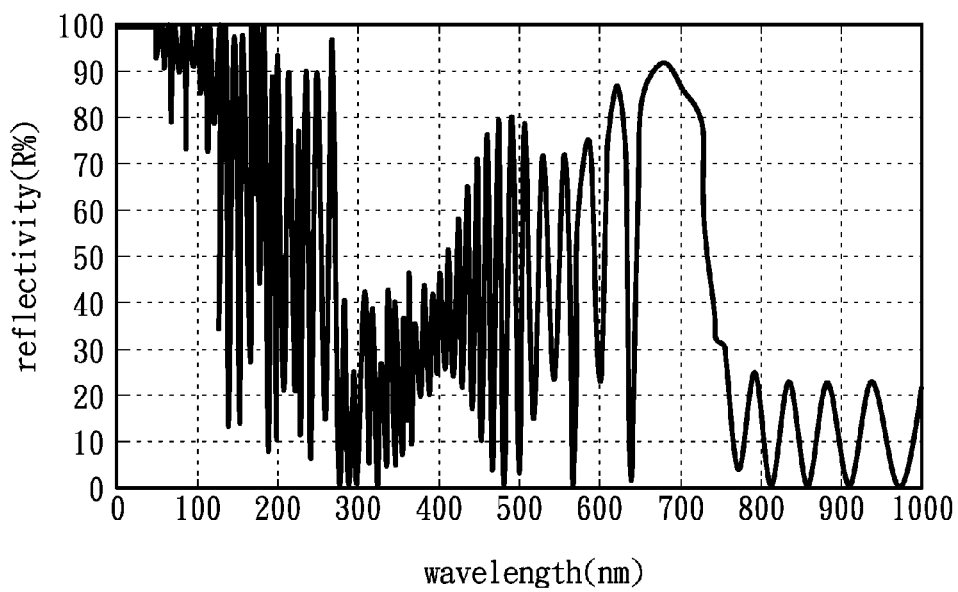
FIG. 1D shows a curve schematic diagram of different wavelengths corresponding to different reflectivity when using 50 layers of the multilayer reflective sheet having a thickness gradient variation according to the instant disclosure.
Figure 1E:
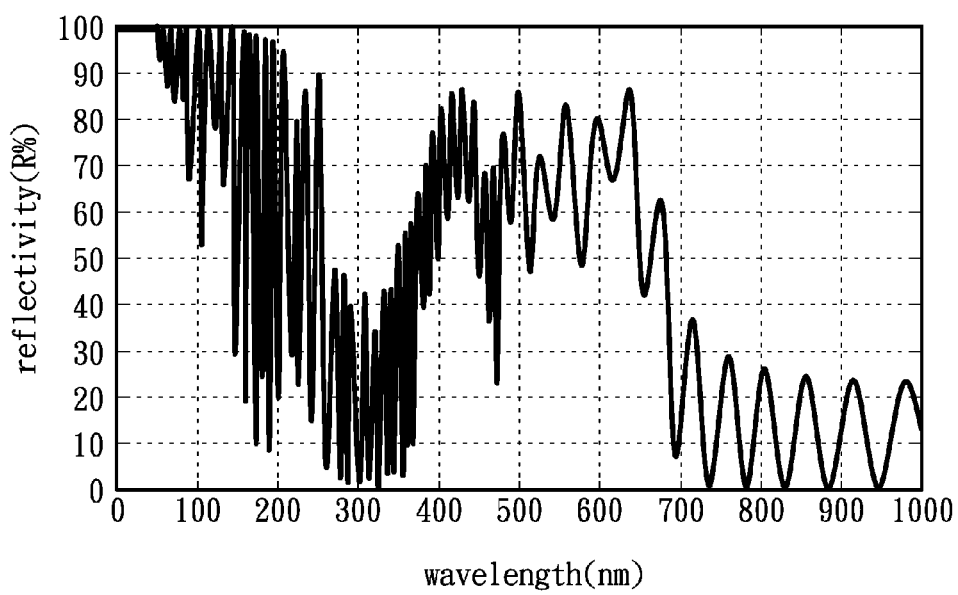
FIG. 1E shows a curve schematic diagram of different wavelengths corresponding to different reflectivity when using 50 layers of the multilayer reflective sheet having a thickness increasing variation according to the prior art.
Figure 1F:
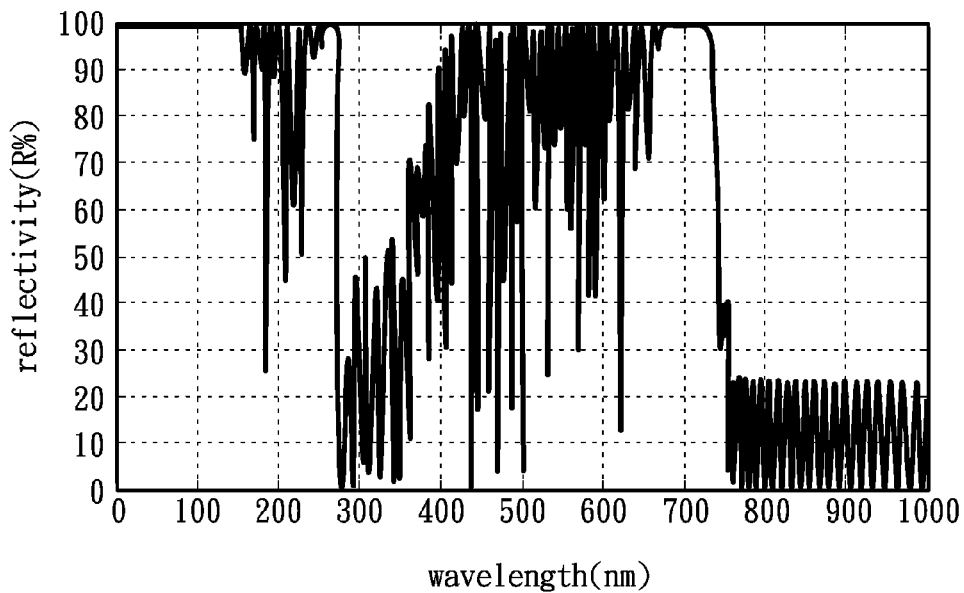
FIG. 1F shows a curve schematic diagram of different wavelengths corresponding to different reflectivity when using 200 layers of the multilayer reflective sheet having a thickness gradient variation according to the instant disclosure.
Figure 1G:
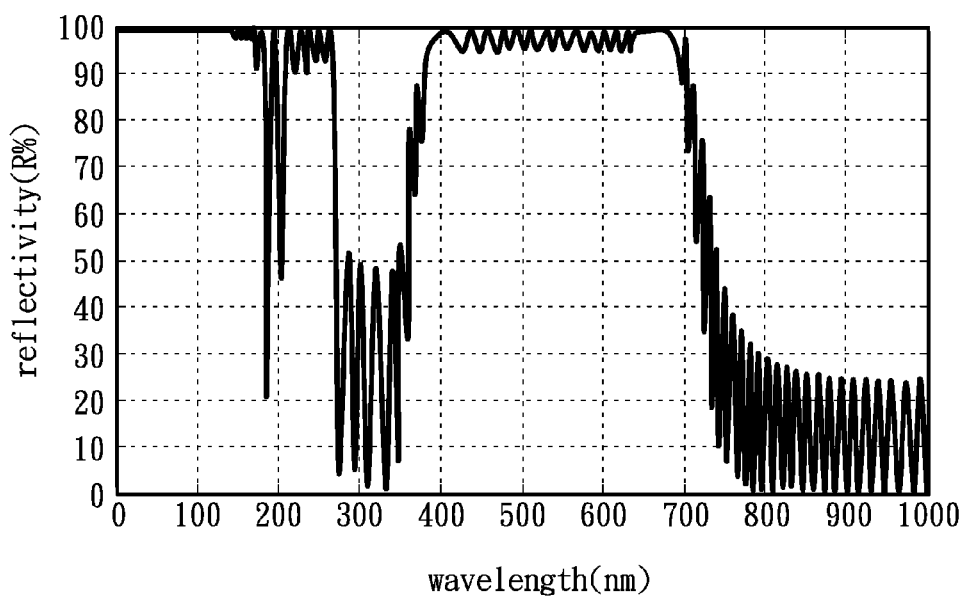
FIG. 1G shows a curve schematic diagram of different wavelengths corresponding to different reflectivity when using 200 layers of the multilayer reflective sheet having a thickness increasing variation according to the prior art.
Figure 1H:
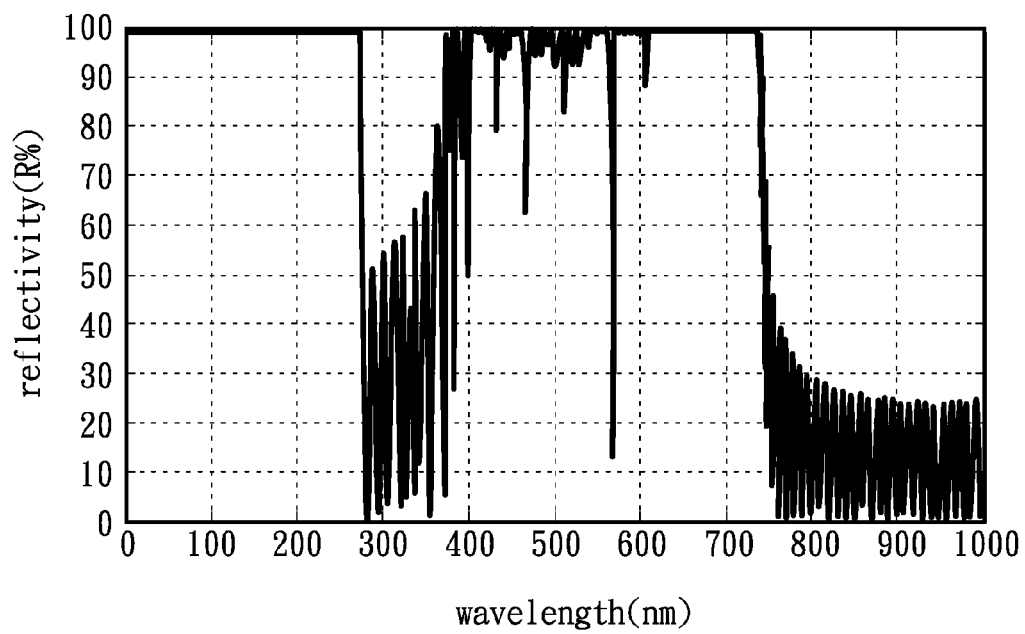
FIG. 1H shows a curve schematic diagram of different wavelengths corresponding to different reflectivity when using 500 layers of the multilayer reflective sheet having a thickness gradient variation according to the instant disclosure.
Figure 1I:
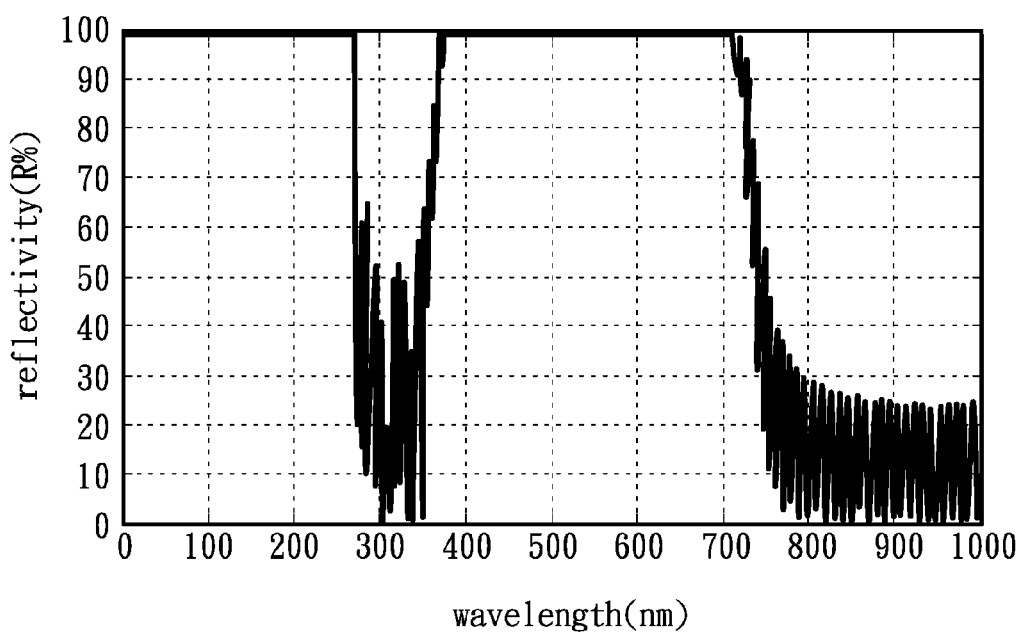
FIG. 1I shows a curve schematic diagram of different wavelengths corresponding to different reflectivity when using 500 layers of the multilayer reflective sheet having a thickness increasing variation according to the prior art.

Referring to FIG. 1D and FIG. 1E, where FIG. 1D shows a curve schematic diagram of different wavelengths corresponding to different reflectivity when using 50 layers of the multilayer reflective sheet having a thickness gradient variation according to the instant disclosure, and FIG. 1E shows a curve schematic diagram of different wavelengths corresponding to different reflectivity when using 50 layers of the multilayer reflective sheet having a thickness increasing variation according to the prior art. Moreover, the number of the layers of the multilayer reflective sheet can be increased by using a multiplier. Referring to FIG. 1F and FIG. 1G, where FIG. 1F shows a curve schematic diagram of different wavelengths corresponding to different reflectivity when using 200 layers of the multilayer reflective sheet having a thickness gradient variation according to the instant disclosure, and FIG. 1G shows a curve schematic diagram of different wavelengths corresponding to different reflectivity when using 200 layers of the multilayer reflective sheet having a thickness increasing variation according to the prior art. Furthermore, the number of the layers of the multilayer reflective sheet can be increased again by using another multiplier. Referring to FIG. 1H and FIG. 1I, where FIG. 1H shows a curve schematic diagram of different wavelengths corresponding to different reflectivity when using 500 layers of the multilayer reflective sheet having a thickness gradient variation according to the instant disclosure, and FIG. 1I shows a curve schematic diagram of different wavelengths corresponding to different reflectivity when using 500 layers of the multilayer reflective sheet having a thickness increasing variation according to the prior art. Hence, when the number of the layers of the multilayer reflective sheet is increased, the curve distribution of the instant disclosure (as shown in FIG. 1H) is very similar to the curve distribution of the prior art (as shown in FIG. 1I).

Therefore, because the thicknesses of the polymer films (100A, 100B) are gradually decreased from the two outmost sides of the multilayer reflective sheet 10 to the middle of the multilayer reflective sheet 10, the thicknesses of the two polymer films (100A, 100B) on the two outmost sides are maximum in order to prevent the multilayer reflective sheet 10 from being damaged by the shearing force during the co-extrusion process. Moreover, the multilayer reflective sheet 10 has a symmetrical thickness structure, the fluid velocity and the fluid pressure in the flow channel can be balanced during the co-extrusion process.

Specifically, as shown in FIG. 1A, the outmost polymer film 100A of the upper half of the multilayer reflective sheet 10 has a thickness h1 which is equal to the thickness H1 of the outmost polymer film 100B of the lower half of the multilayer reflective sheet 10; and the innermost polymer film 100B of the upper half of the multilayer reflective sheet 10 has a thickness h100 which is equal to the thickness H100 of the innermost polymer film 100A of the lower half of the multilayer reflective sheet 10. Similarly, the thicknesses of the remaining polymer films in the upper half and the lower half of the multilayer reflective sheet 10 are corresponding to each other respectively, thereby forming a symmetric thickness structure.

Moreover, by precisely controlling the relative thickness between the thicknesses (h1, H1) and the thicknesses (h100, H100), the multilayer reflective sheet 10 provided by the instant disclosure would significantly reduce the detrimental effects caused by the ununiformed fluid pressure and fluid velocity in the flow channel of the feedblock. For example, the thickness h1 of the outmost polymer film 100A of the upper half of the multilayer reflective sheet 10 is less than or equal to three times of the thickness 100$h$ of the innermost polymer film 100B of the upper half of the multilayer reflective sheet 10 (i.e., h1/h100≤3). Preferably, the thickness h1 of the outmost polymer film 100A of the upper half of the multilayer reflective sheet 10 is less than or equal to two point five times of the thickness 100$h$ of the innermost polymer film 100B of the upper half of the multilayer reflective sheet 10 (i.e., h1/h100≤2.5). More preferably, the ratio of thickness h1 of the outmost polymer film 100A of the upper half of the multilayer reflective sheet 10 to the thickness 100$h$ of the innermost polymer film 100B of the upper half of the multilayer reflective sheet 10 is in the range of 2.0~2.2 (i.e., 2.0≤h1/h100≤2.2). The same relative thickness is also applied to the lower half of the multilayer reflective sheet 10 for obtaining a symmetric thickness structure.

It is demonstrated that while controlling the ratio between the thickness of the outmost polymer layer and the innermost polymer layer would obtain a multilayer reflective sheet 10 having an optical power larger than 85%. Under the condition of h1/h100≤2.5, it is able to obtain a multilayer reflective sheet 10 having an optical power of 85%~90%, and when 2.0≤h1/h100≤2.2, the optical power of the multilayer reflective sheet 10 is ≥90%.

Furthermore, according to different operating needs, the plurality of polymer films (100A, 100B) can be manufactured with thicker protection layer at its top or bottom surface, so as to protect the internal layers of the polymer films (100A, 100B). At least one of the polymer films (100A, 100B) is a ultra-violet reflector for reflecting ultra-violet lights, and can furthermore include a layer of infrared reflector for reflecting infrared lights. The ultra-violet reflector or infrared reflector can be composed of single-layer optical film or multi-layer optical films; which can be manufactured with multi-layer polymer films, and there can also be additions of metal oxide particles or ultra-violet absorbent; and can be placed via lamination on any surface of the polymer films (100A, 100B) through coating, extrusion or ultra-violet paste curing. Other functional layers (such as a scratching-resistant function, an antistatic function, a support function, a diffusivity increasing function, a tear resistance function, an impact resistance function, a UV light resistance function, an infrared light resistance function etc.) can be added for the polymer films (100A, 100B), such as locating a structure layer for increasing the strength and resilience, a protection layer for increasing resistance to scratch, a Nano-layer with self-cleansing effect, or locating a micro structure layer with convergence, diffraction, or diffusion capability on any surface of the polymer films (100A, 100B). The optical microstructure layer with specific optical effect can be prism shaped, pyramid shaped, hemisphere shaped, aspheric shaped, Frensel lens shaped, lenticular, or grating structured. Furthermore, the multilayer reflective sheet 10 can be formed through single-axial or bi-axial stretching, so that the average transmittance rate of the multilayer reflective sheet for light spectrum 380~780 nm is selectively between 30% and 90%, thereby effectively controls the intensity of light. Also, when the multilayer reflective sheet 10 is formed through bi-axial stretching, then according to differences in usage needs, the multilayer reflective sheet 10 can selectively be polarized or non-polarized.

For example, the structure of the multilayer reflective sheet 10 is formed through many layers of material stacked in sequence of refraction rate, such as shown in FIG. 1A of the polymer films (100A, 100B); in actuality the number of layers formed by all the polymer films (100A, 100B) so as to make the multilayer reflective sheet 10 can be ranged from the tens to hundreds. FIG. 1A is merely a schematic representation of the multi-layer structure, and does not show structure layers in the hundreds, and these tens to hundreds layers of polymer films (100A, 100B) are composed of at least two types of material inter-changing in sequence; wherein the material of one of the layer conforms to the condition of NX≠NY≠NZ, and the optical thickness (refraction rate times physical thickness) of each layer of the optical films results in phase difference. Specific phase difference is a necessary condition for generating optical interference. Through the overall thickness of the multilayer reflective sheet 10, the material, and the extent of stretching during the manufacturing process, the optical characteristic can be varied, and so adjustment can be designed according to specific needs. The characteristic of the multilayer reflective sheet 10 can be adjusted according to needs, such that via forming through single-axial or bi-axial stretching, the average transmittance rate of the multilayer reflective sheet 10 for light spectrum 380~780 nm can be selectively between 30% and 90%.

Furthermore, the multilayer reflective sheet 10 can utilize single-axial or bi-axial stretching formation, so as to effectively adjust P and S polarization pattern ratio of the linearly polarized light; or utilize just the bi-axial stretching formation to generate lights that have no polarization pattern. Furthermore, a surface structure can be located on any surface of the polymer films (100A, 100B) that forms the internal part of the multilayer reflective sheet 10. The surface structure not only provides physical structure characteristics of additional functionality such as anti-sticking and anti-scratching, but may also include a photo-catalyst layer or a self-cleansing layer that provides corresponding functionalities, such that when light beams enter the photo-catalyst layer then harmful environmental substances can be broken down. Besides specialized functionality, another function provided by locating a surface structure is to provide optical utility, such as providing structures that is prism shaped, pyramid shaped, hemisphere shaped, aspheric shaped, Fresnel lens shaped, or grating structured, or a combination thereof. Simply stated, by locating a surface structure on the surface of polymer films (100A, 100B), the optical effects of convergence, blending, diffraction, and scattering can be generated.

During manufacturing process, especially while the multilayer reflective sheet 10 is forming, the molecular chain and molecular orientation of the polymer internal structure can be varied through a stretching machine in a single-axial or bi-axial formation, so that its physical characteristic changes, and the parameter affecting the stretch formation includes stretching temperature, speed, scaling factor, contraction, formation path, and heat setting temperature and time.

If single-axial or bi-axial stretching formation is utilized, generally the scaling ratio of single-axial stretching is from 1.5 to 6 times, and possibly greater, which is dependent upon needs and film material. Therein the film material of the polymer films (100A, 100B) includes polyethylene terephthalate (PET), polycarbonate (PC), tri-acetyl cellulose (TAC), polymethylmethacrylate (PMMA) particle, methyl-methacrylate styrene (MS), polypropylene (PP), polystyrene (PS), polymethylmethacrylate (PMMA), cyclic olefin copolymer (COC), polyethylene naphthalate (PEN), ethylene-tetrafluoroethylene (ETFE), polylactide (PLA), or a mix or polymerization of these materials thereof. Those optical elements formed via single-axial stretching formation can have specific directional polarization effect, thereby be used to adjust polarized wavelength range for light.

If bi-axial stretching formation is utilized, the scaling factor for each axial can be different, and the stretching formation can be according to sequence or both axial simultaneously, so that besides able to adjust for wavelength range, P and S polarization pattern ratio of light passing through multilayer reflective sheet 10 can also be managed, such that adjustment can be made to near non-polarized condition.

Figure 1J:
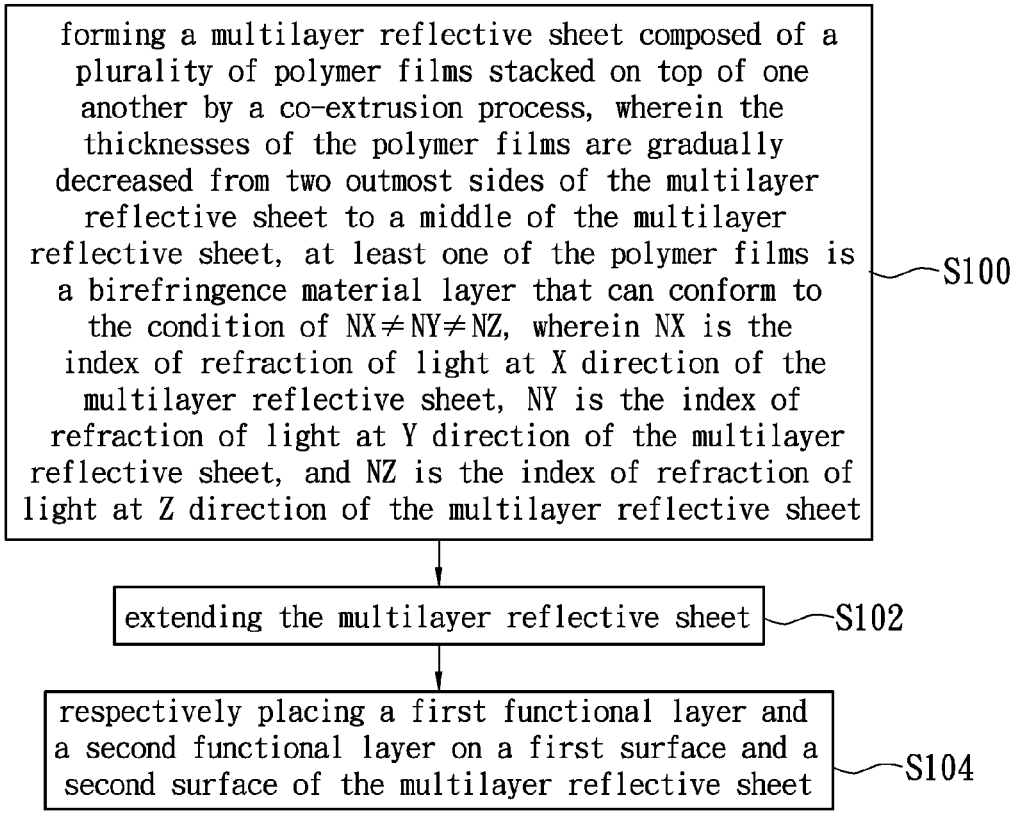
FIG. 1J shows a flowchart of the method of manufacturing the reflective optical film according to the first embodiment of the instant disclosure.

Referring to FIG. 1J, the first embodiment of the instant disclosure provides a method of manufacturing a reflective optical film, comprising: forming a multilayer reflective sheet 10 composed of a plurality of polymer films (100A, 100B) stacked on top of one another by a co-extrusion process, wherein each polymer film (100A or 100B) has a thickness, every two adjacent polymer films (100A, 100B) are two different materials, the thicknesses of the polymer films (100A, 100B) are gradually decreased from two outmost sides of the multilayer reflective sheet 10 to a middle of the multilayer reflective sheet 10, at least one of the polymer films (100A, 100B) is a birefringence material layer that can conform to the condition of NX≠NY≠NZ, wherein NX is the index of refraction of light at X direction of the multilayer reflective sheet 10, NY is the index of refraction of light at Y direction of the multilayer reflective sheet 10, and NZ is the index of refraction of light at Z direction of the multilayer reflective sheet 10 (S100); extending the multilayer reflective sheet 10 (S102); and then respectively placing a first functional layer 11A and a second functional layer 11B on a first surface and a second surface of the multilayer reflective sheet 10 (S104).

Figure 1K:
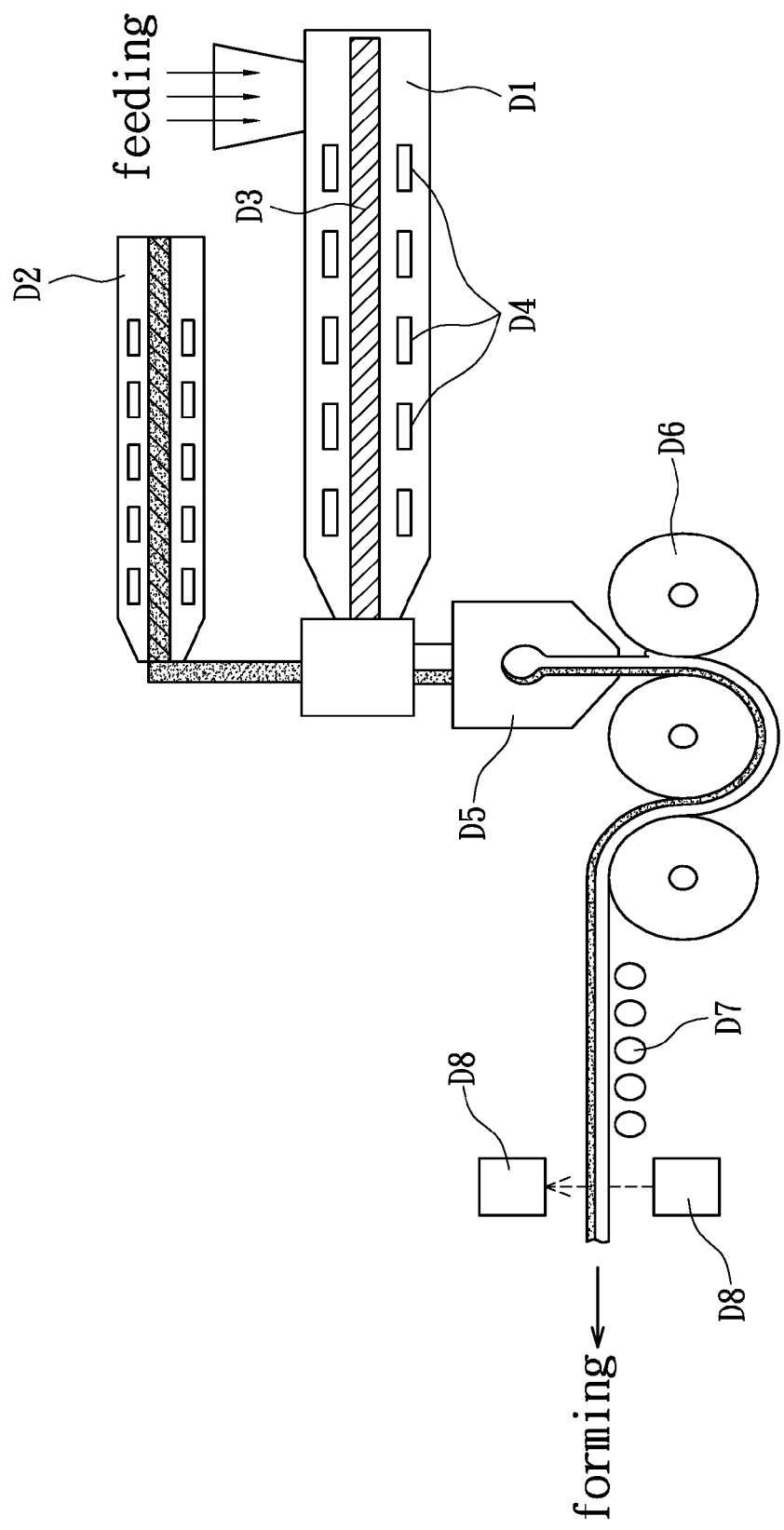
FIG. 1K shows an instrument schematic diagram for manufacturing the reflective optical film by a co-extrusion process according to the instant disclosure.

Furthermore, FIG. 1K shows a schematic diagram of the method for manufacturing a multi-layer structure according to the instant disclosure. A multi-layer extrusion process is particularly used to form a multi-layer substrate. As shown in the diagram, the materials are used to form the multiple layers via different feeding regions. In the preferred embodiment, the materials are separately fed via the primary feeding region D1 and the secondary feeding region D2, and then a screw rod D3 and a heater D4 disposed on the feeding region are used to blend the materials. The materials have high selectivity. The material in each layer can be different. In a specific layer, the transparent diffusing beads are doped. Further, the materials are simultaneously under the blending-refine process on the feeding machine. Through the extrusion process at the mold head D5, the substrate with a certain thickness is obtained. After the modulation by the rolls D6, the thickness can be adjusted. After that, the surface structure is formed on one surface or both above and below surfaces. At last step of cooling through the cooling plate D7, the materials are solidified. The examination machines D8 can be used to examine the final product such as the reflective optical film.

According to one of the embodiments of the instant disclosure, the multilayer reflective sheet 10 is formed by a plurality of composite materials after repeatedly stacking in the co-extrusion procedure. The variant refractive indexes and thicknesses of the multilayer reflective sheet 10 formed by multiple types of high-polymer meet the condition of optical interference that cause the light polarized and reflected. Since the interference condition is seriously defined, the coating technology used for the general optical lens often require multiple layers with high and low refractive indexes, such as dozen or hundred layers. In the instant disclosure, the multilayer reflective sheet 10 can increase the reflectivity of polarized light by producing multiple times of interfered reflection through the multiple layers with high and low refractive indexes. That will be like the mentioned interference made by plural films. The multilayer reflective sheet 10 will have better reflectivity to a certain wavelength when the multilayer reflective sheet 10 has more layers stacked and better evenness control for higher variations of the refractive indexes. For example, the current embodiment repeatedly stacks the PET and PEN materials to form an $(AB)^n$ structure in the co-extrusion process. In which, n is an integer which is ranged within 10 to 500 based on the design, and the preferred value is within 120 through 180. When the temperature in the stretch procedure is controlled just as the anisotropy of the birefringence of the material happens, that is to make the refractive indexes of anisotropic and isotropic films change, and meanwhile the thickness with one-quarter wavelength is also employed, it is to accomplish the interference of multi-layer.

Figure 10:
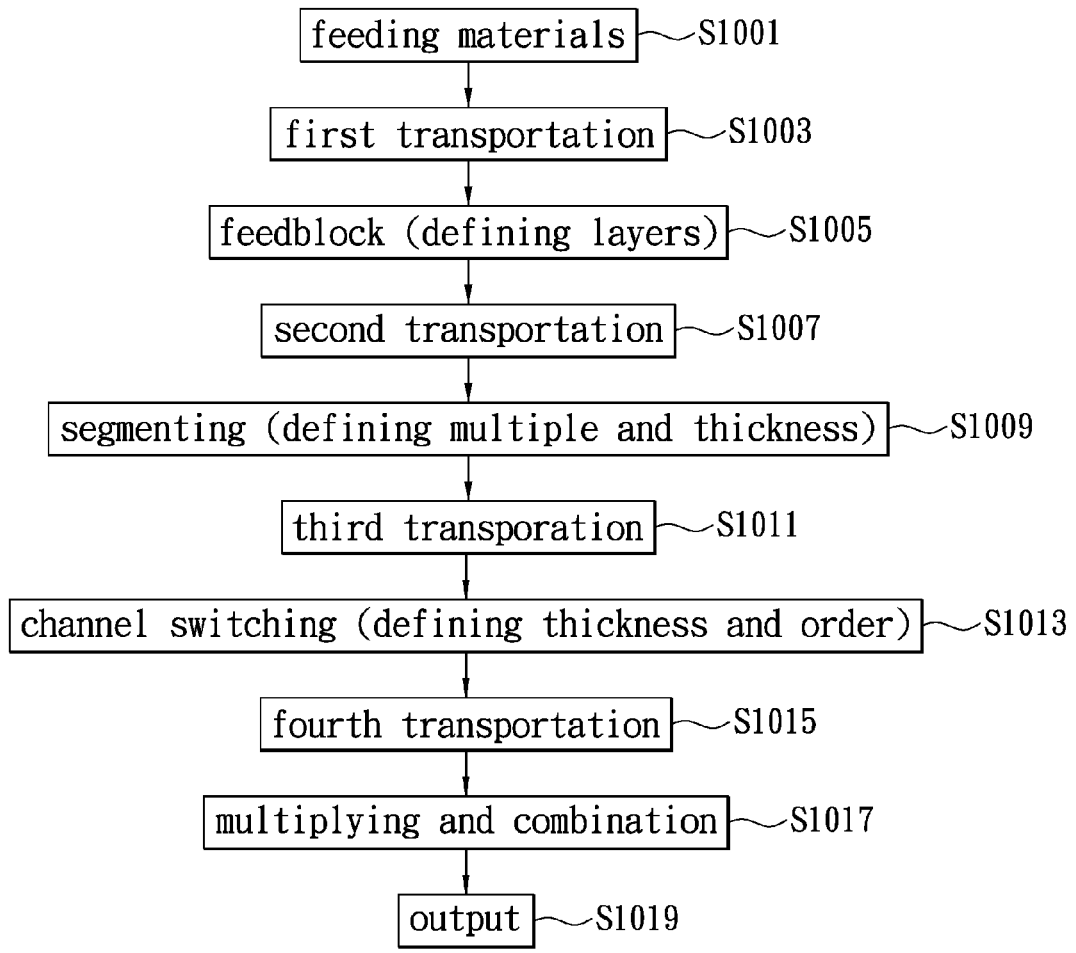
FIG. 10 shows a flow chart describing the method for forming the multilayer reflective sheet according to one embodiment of the instant disclosure.
Figure 11:
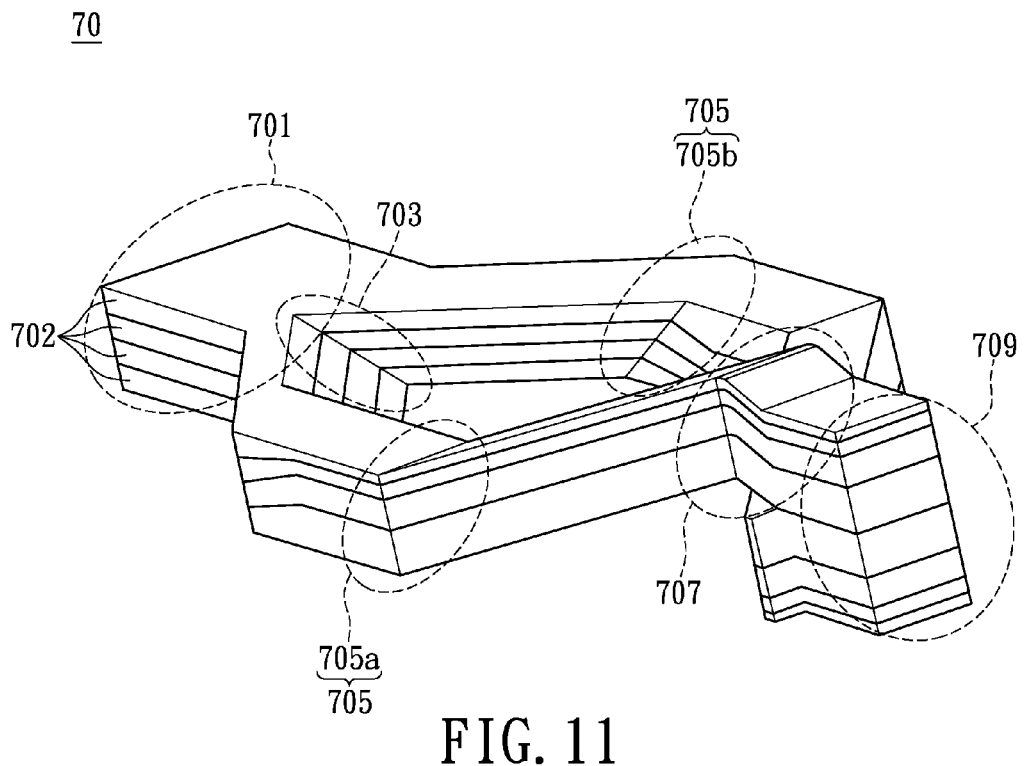
FIG. 11 shows a schematic diagram of the feedblock multiplier according to one embodiment of the instant disclosure.

Please refer to FIG. 10 and FIG. 11. The step of forming a multilayer reflective sheet 10 composed of a plurality of polymer films (100A, 100B) stacked on top of one another is conducted by using a feedblock multiplier 70 with thickness-gradient variation and comprises the following steps. The first step is feeding materials (step S1001) to the feedblock multiplier 70. Next, transporting the materials to a feedblock section 701 (first transportation, step S1003), and then dividing or splitting the materials into a plurality of fluids over a plurality of channels (step S1005).

The fluids are then transported to a segmenting section 703 (second transportation, step S1007). The segmenting section 703 defines a bevel or a curved cross section configured to define the multiple of layers and render the thickness-gradient variation. The segmenting section 703 performs segmentation to the fluids according to the required cross section (step S1009). The fluids are segmented into a plurality of fluid segments based on the configuration of the cross section, and the multiple of the number of layers is determined accordingly. To be specific, the segmenting section 703 segments the fluids over the channels into at least two fluid segments by the bevel or the curved cross section of the segmenting section 703, wherein each fluid segment includes fluids segmented over the plurality of channels. Generally, the value of multiple multiplied by the number of layers after performing the feedblock process is the number of layers in the multilayer structure end product. The multilayer structure may be designed to combine the other functional layers or structure by additional processes.

The multiple channels of a channel-switching section 705 are used to transport the fluid segments after segmenting process (third transportation, step S1011). The thickness variation of the product may be configured through the structural design of the feedblock multiplier 70. The relative positions of the layers of the structure may be defined at the same moment (step S1013).

The fluids over channels of the channel-switching section 705 are transported (fourth transportation, step S1015) and combined at the multiplier section 707 (step S1017). The each channel may have its unique design of the thickness, and the output matter of the channels may have specified layers, relative positions, and thickness variation (step S1019). At last, the multilayer reflective sheet 10 is output from an extruding section 709.

The structure of the feedblock multiplier 70 with thickness-gradient variation is described in detail below.

In FIG. 11, an exemplary embodiment of the feedblock multiplier with thickness-gradient variation in accordance with the present invention is shown. In a first stage, the feedblock multiplier 70 allows one or more materials to be input through an input section (not shown).

The feedblock section 701 is coupled to the input section. The feedblock section 701 in the present example divides the one or more kinds of materials into several fluids of the channels 702. This example, but not limited to, provides four channels 702 with the same thickness. The feeding materials are then transported through the four channels 702. The material over each channel 702 is then delivered to the corresponding channel of the segmenting section 703.

The segmenting section 703 is particularly disposed at the output end of the feedblock section 701. The fluids over the mentioned four channels 702 are then segmented into one or more fluid segments depending on the configuration of the cross section thereof. The present example allows the fluids to be segmented to two fluid segments. In which, each fluid segment includes the segmented fluids over the four channels 702. The two segments are exemplarily transported over a first channel-switching section 705a and a second channel-switching section 705b respectively.

The channel switching section 705 comprises a first channel-switching section 705a and a second channel-switching section 705b for switching the relative transportation position of the channels in each channel-switching section 705, and the thicknesses of the channels over the channel-switching sections 705 have gradient variation. The first channel-switching section 705a and the second channel-switching section 705b are coupled to the segmenting section 703. According to one of the embodiment of the disclosure, the number of channel-switching sections is depending on the configuration of the cross section of the segmenting section 703. The each fluid segment is flowing over its corresponding channel-switching section.

The fluid segments passing through the two channel-switching sections 705a, 705b are then combined in a multiplier section 707. The entrance of the multiplier section 707 is coupled to the first channel-switching section 705a and the second channel-switching section 705b, and is served to stack the channels over the channel-switching sections for outputting multilayer structure with multiple layers. The final product is consequently from an extruding section 709.

As shown in FIG. 11, the outlet of the extruding section 709 is formed to have the structure implementing the multilayer structure with thickness-gradient variation. In accordance with the instant disclosure, the variation of the thicknesses among the layers of the multilayer structure is formed based on the design of the cross section of segmenting section 703. Furthermore, the channels within the above-described first channel-switching section 705a and the second channel-switching section 705b may also be designed to have thickness-gradient variation, and therefore causes the implementation of the final multilayer structure.

Figure 1L:
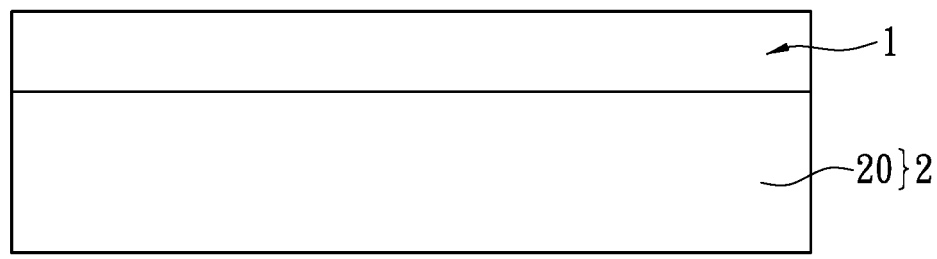
FIG. 1L shows a lateral, schematic view of the reflective light-polarizing unit applied to the image display unit according to the first embodiment of the instant disclosure.
Figure 1M:
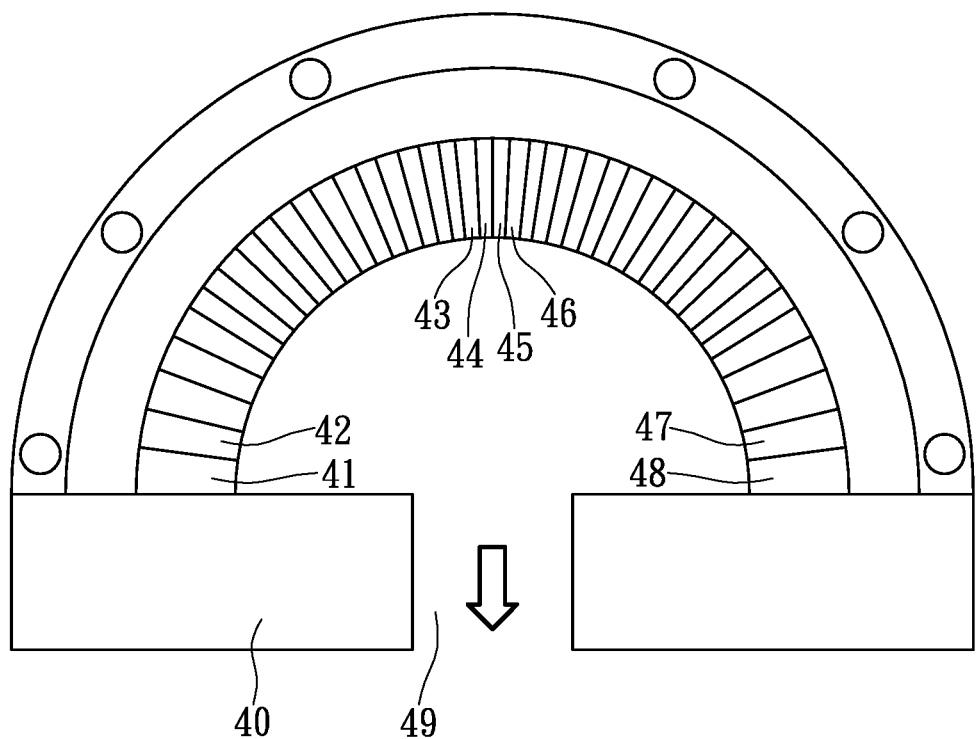
FIG. 1M shows a schematic diagram of the semicircle feedblock according to the instant disclosure.

Furthermore, referring to FIG. 1B and FIG. 1L, the first embodiment of the instant disclosure further provides an image display device M, comprising: a reflective light-polarizing unit 1 and an image display unit 2. The image display unit 2 includes at least one image display screen 20, wherein the reflective light-polarizing unit 1 is disposed on the top side of the at least one image display screen 20.

Second Embodiment

Figure 2A:
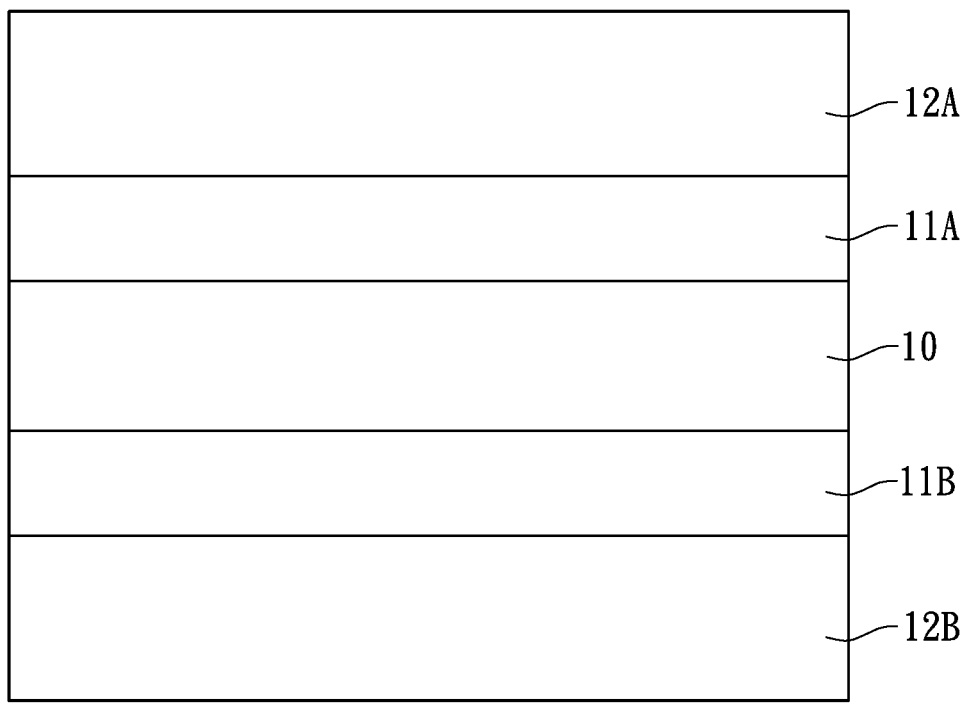
FIG. 2A shows a lateral, schematic view of the reflective optical film according to the second embodiment of the instant disclosure.

Referring to FIG. 2A, the second embodiment of the instant disclosure provides a reflective optical film comprising a reflective light-polarizing unit 1. Comparing FIG. 2A with FIG. 1B, the difference between the second embodiment and the first embodiment is as follows: in the second embodiment, the reflective light-polarizing unit 1 further includes a first substrate 12A and a second substrate 12B respectively disposed on the first functional layer 11A and the second functional layer 11B. For example, the first substrate 12A and the second substrate 12B are selected from the group consisting of polyethylene terephthalate (PET), poly carbonate (PC), polyethylene (PE), poly vinyl chloride (PVC), poly propylene (PP), poly styrene (PS), and polymethylmethacrylate (PMMA), where the first functional layer 11A, the second functional layer 11B, the first substrate 12A or the second substrate 12B also can be manufactured as a multilayer structure.

Figure 2B:
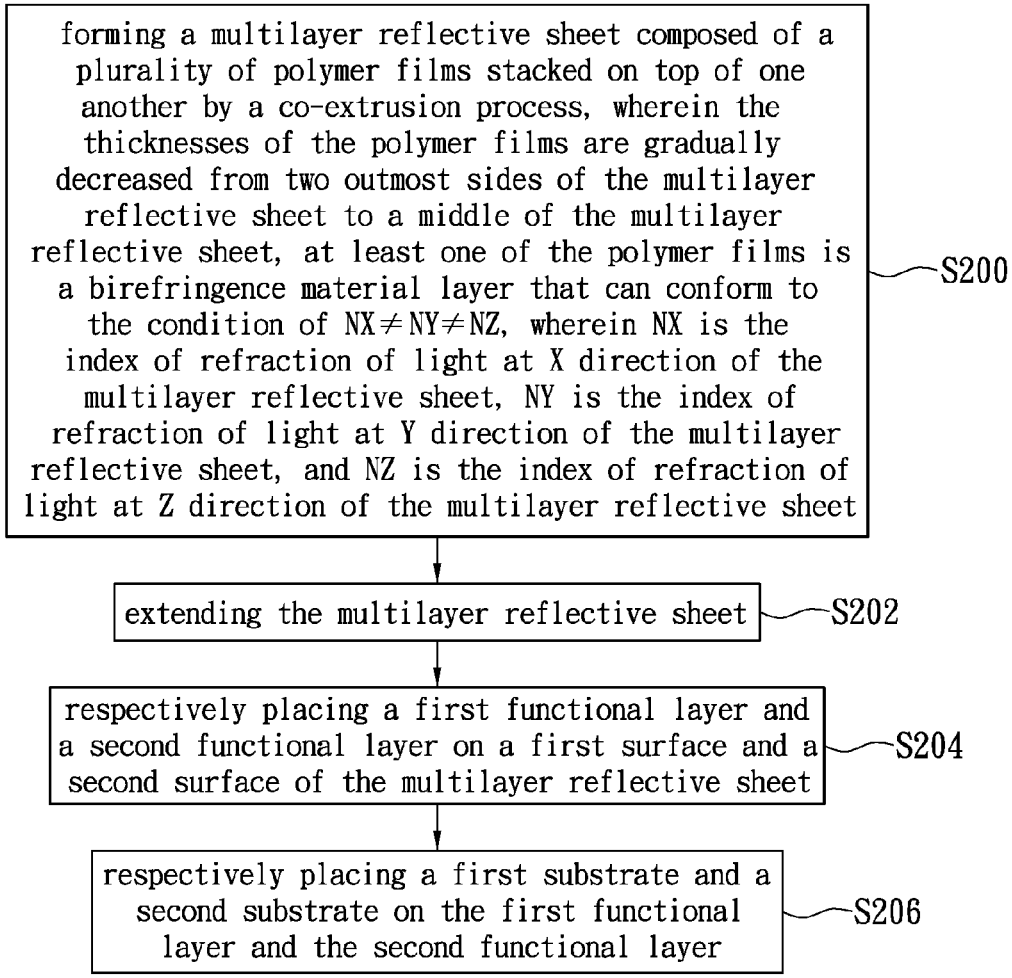
FIG. 2B shows a flowchart of the method of manufacturing the reflective optical film according to the second embodiment of the instant disclosure.

Referring to FIG. 2B, the second embodiment provides a method of manufacturing a reflective optical film, comprising: forming a multilayer reflective sheet 10 composed of a plurality of polymer films (100A, 100B) stacked on top of one another by a co-extrusion process, wherein each polymer film (100A or 100B) has a thickness, every two adjacent polymer films (100A, 100B) are two different materials, the thicknesses of the polymer films (100A, 100B) are gradually decreased from two outmost sides of the multilayer reflective sheet 10 to a middle of the multilayer reflective sheet 10, at least one of the polymer films (100A, 100B) is a birefringence material layer that can conform to the condition of NX≠NY≠NZ, wherein NX is the index of refraction of light at X direction of the multilayer reflective sheet 10, NY is the index of refraction of light at Y direction of the multilayer reflective sheet 10, and NZ is the index of refraction of light at Z direction of the multilayer reflective sheet 10 (S200); extending the multilayer reflective sheet 10 (S202); respectively placing a first functional layer 11A and a second functional layer 11B on a first surface and a second surface of the multilayer reflective sheet 10 (S204); and then respectively placing a first substrate 12A and a second substrate 12B on the first functional layer 11A and the second functional layer 11B in order to form a reflective light-polarizing unit 1 (S206).

Third Embodiment

Figure 3A:
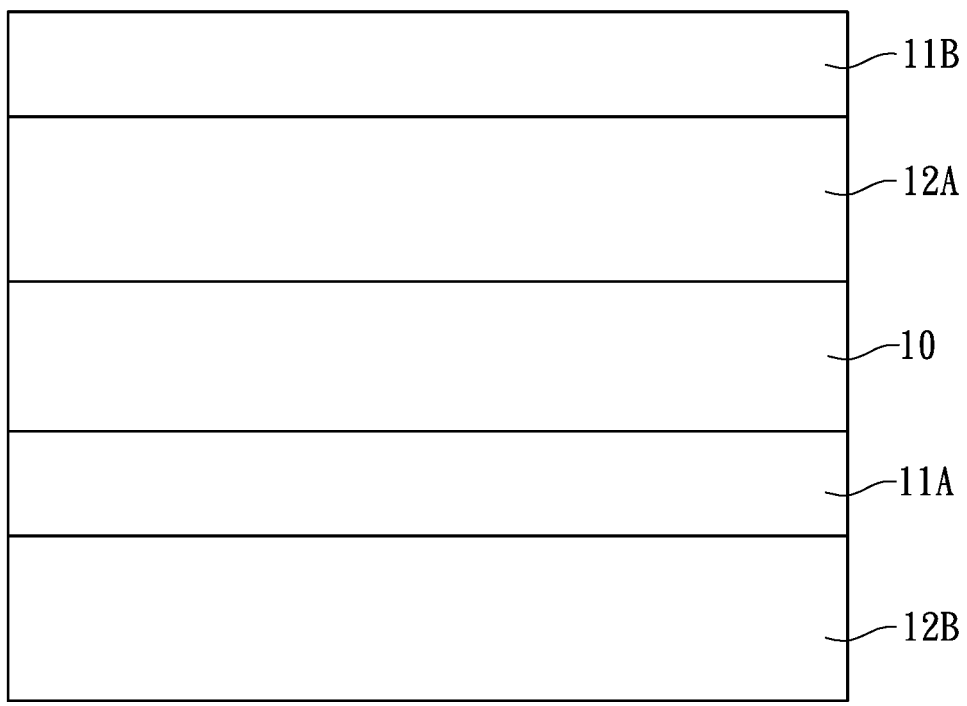
FIG. 3A shows a lateral, schematic view of the reflective optical film according to the third embodiment of the instant disclosure.

Referring to FIG. 3A, the third embodiment of the instant disclosure provides a reflective optical film comprising a reflective light-polarizing unit 1. Comparing FIG. 3A with FIG. 1B, the difference between the third embodiment and the first embodiment is as follows: in the third embodiment, the first substrate 12A and the first functional layer 11A are respectively disposed on a first surface and a second surface of the multilayer reflective sheet 10, and the second substrate 12B and the second functional layer 11B are respectively disposed on the first functional layer 11A and the first substrate 12A.

Figure 3B:
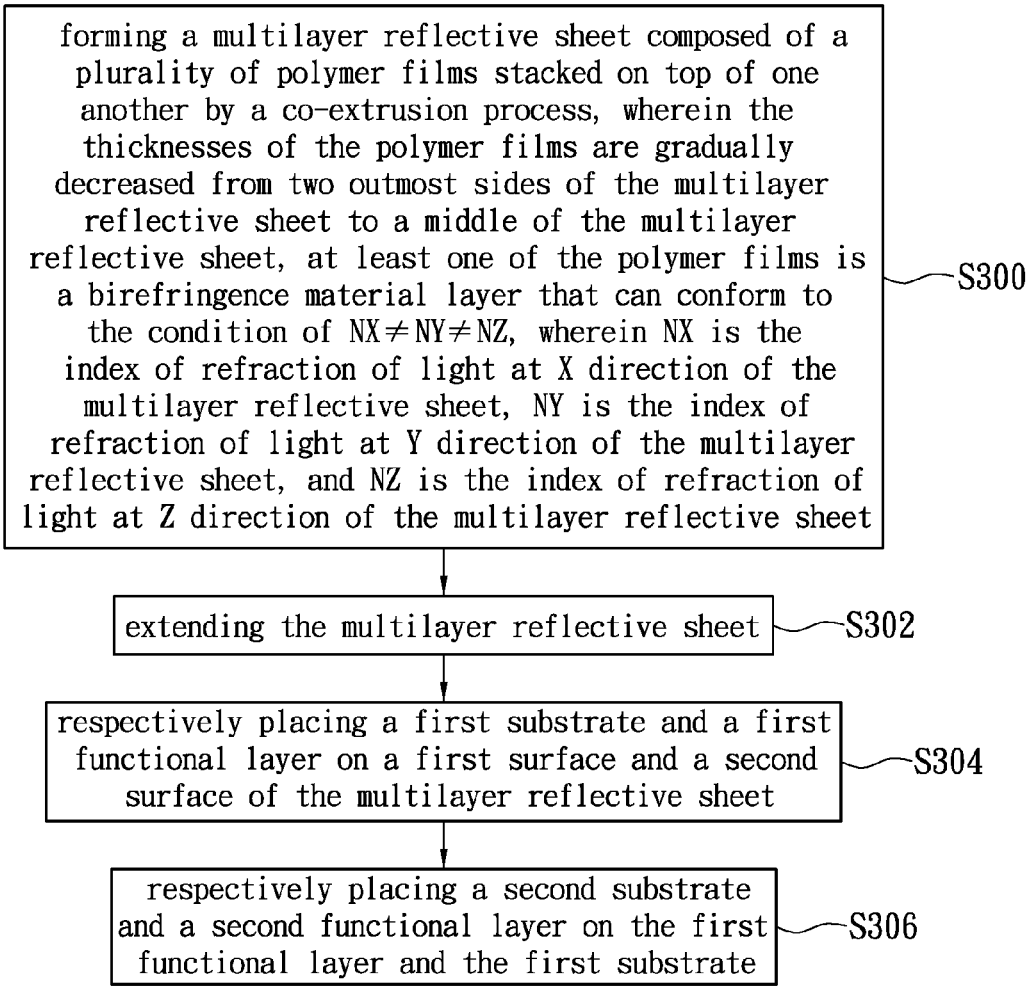
FIG. 3B shows a flowchart of the method of manufacturing the reflective optical film according to the third embodiment of the instant disclosure.

Referring to FIG. 3B, the third embodiment provides a method of manufacturing a reflective optical film, comprising: forming a multilayer reflective sheet 10 composed of a plurality of polymer films (100A, 100B) stacked on top of one another by a co-extrusion process, wherein each polymer film (100A or 100B) has a thickness, every two adjacent polymer films (100A, 100B) are two different materials, the thicknesses of the polymer films (100A, 100B) are gradually decreased from two outmost sides of the multilayer reflective sheet 10 to a middle of the multilayer reflective sheet 10, at least one of the polymer films (100A, 100B) is a birefringence material layer that can conform to the condition of NX≠NY≠NZ, wherein NX is the index of refraction of light at X direction of the multilayer reflective sheet 10, NY is the index of refraction of light at Y direction of the multilayer reflective sheet 10, and NZ is the index of refraction of light at Z direction of the multilayer reflective sheet 10 (S300); extending the multilayer reflective sheet 10 (S302); respectively placing a first substrate 12A and a first functional layer 11A on a first surface and a second surface of the multilayer reflective sheet 10 (S304); and then respectively placing a second substrate 12B and a second functional layer 11B on the first functional layer 11A and the first substrate 12A in order to form a reflective light-polarizing unit 1 (S306).

Fourth Embodiment

Figure 4A:
FIG. 4A shows a lateral, schematic view of the reflective optical film according to the fourth embodiment of the instant disclosure.

Referring to FIG. 4A, the fourth embodiment of the instant disclosure provides a reflective optical film comprising a reflective light-polarizing unit 1. Comparing FIG. 4A with FIG. 1B, the difference between the fourth embodiment and the first embodiment is as follows: in the fourth embodiment, the first substrate 12A and the second substrate 12B are respectively disposed on a first surface and a second surface of the multilayer reflective sheet 10, and the first functional layer 11A and the second functional layer 11B are respectively disposed on the first substrate 12A and the second substrate 12B.

Figure 4B:
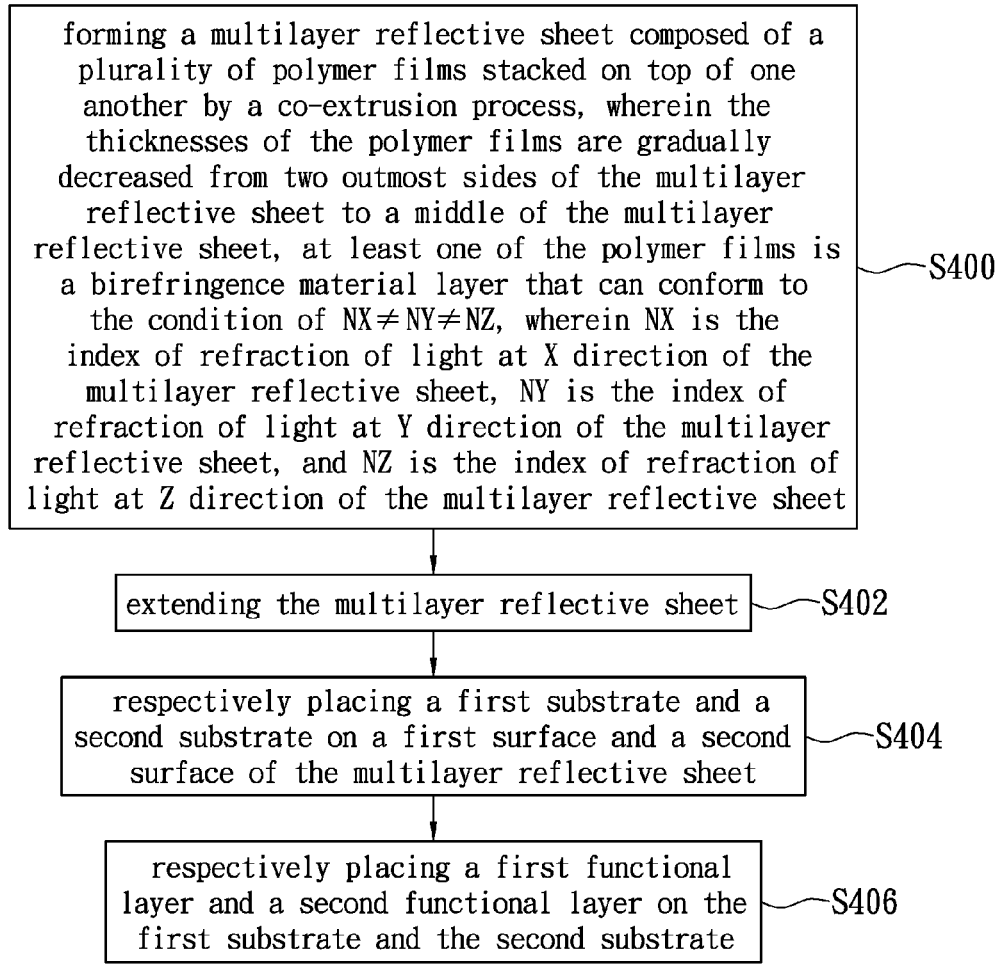
FIG. 4B shows a flowchart of the method of manufacturing the reflective optical film according to the fourth embodiment of the instant disclosure.

Referring to FIG. 4B, the fourth embodiment provides a method of manufacturing a reflective optical film, comprising: forming a multilayer reflective sheet 10 composed of a plurality of polymer films (100A, 100B) stacked on top of one another by a co-extrusion process, wherein each polymer film (100A or 100B) has a thickness, every two adjacent polymer films (100A, 100B) are two different materials, the thicknesses of the polymer films (100A, 100B) are gradually decreased from two outmost sides of the multilayer reflective sheet 10 to a middle of the multilayer reflective sheet 10, at least one of the polymer films (100A, 100B) is a birefringence material layer that can conform to the condition of NX≠NY≠NZ, wherein NX is the index of refraction of light at X direction of the multilayer reflective sheet 10, NY is the index of refraction of light at Y direction of the multilayer reflective sheet 10, and NZ is the index of refraction of light at Z direction of the multilayer reflective sheet 10 (S400); extending the multilayer reflective sheet 10 (S402); respectively placing a first substrate 12A and a second substrate 12B on a first surface and a second surface of the multilayer reflective sheet 10 (S404); and then respectively placing a first functional layer 11A and a second functional layer 11B on the first substrate 12A and the second substrate 12B in order to form a reflective light-polarizing unit 1 (S406).

Fifth Embodiment

Referring to FIG. 5A, the fifth embodiment of the instant disclosure provides a reflective optical film comprising a reflective light-polarizing unit 1. Comparing FIG. 5A with FIG. 1B, the difference between the fifth embodiment and the first embodiment is as follows: in the fifth embodiment, the multilayer reflective sheet 10 includes two surface structures (11A', 11B') respectively formed on two opposite outside surfaces thereof, and each surface structure (11A', 11B') has a plurality of diffusion particles 110 distributed therein.

Referring to FIG. 5B, the fifth embodiment provides a method of manufacturing a reflective optical film, comprising: forming a multilayer reflective sheet 10 composed of a plurality of polymer films (100A, 100B) stacked on top of one another by a co-extrusion process, wherein each polymer film (100A or 100B) has a thickness, every two adjacent polymer films (100A, 100B) are two different materials, the thicknesses of the polymer films (100A, 100B) are gradually decreased from two outmost sides of the multilayer reflective sheet 10 to a middle of the multilayer reflective sheet 10, at least one of the polymer films (100A, 100B) is a birefringence material layer that can conform to the condition of NX≠NY≠NZ, wherein NX is the index of refraction of light at X direction of the multilayer reflective sheet 10, NY is the index of refraction of light at Y direction of the multilayer reflective sheet 10, and NZ is the index of refraction of light at Z direction of the multilayer reflective sheet 10 (S500); extending the multilayer reflective sheet 10 (S502); respectively forming two surface structures (11A', 11B') on two opposite outside surfaces of the multilayer reflective sheet 10, wherein each surface structure (11A', 11B') has a plurality of diffusion particles 110 distributed therein (S504).

Sixth Embodiment

Referring to FIG. 6A, the sixth embodiment of the instant disclosure provides a reflective optical film comprising a reflective light-polarizing unit 1. Comparing FIG. 6A with FIG. 1B, the difference between the sixth embodiment and the first embodiment is as follows: in the sixth embodiment, the multilayer reflective sheet 10 includes a surface structure 11A' formed on an outside surface thereof, the multilayer reflective sheet 10 includes a diffusion film 11B" formed on another outside surfaces thereof, and the surface structure 11A' has a plurality of diffusion particles 110 distributed therein.

Referring to FIG. 6B, the sixth embodiment provides a method of manufacturing a reflective optical film, comprising: forming a multilayer reflective sheet 10 composed of a plurality of polymer films (100A, 100B) stacked on top of one another by a co-extrusion process, wherein each polymer film (100A or 100B) has a thickness, every two adjacent polymer films (100A, 100B) are two different materials, the thicknesses of the polymer films (100A, 100B) are gradually decreased from two outmost sides of the multilayer reflective sheet 10 to a middle of the multilayer reflective sheet 10, at least one of the polymer films (100A, 100B) is a birefringence material layer that can conform to the condition of NX≠NY≠NZ, wherein NX is the index of refraction of light at X direction of the multilayer reflective sheet 10, NY is the index of refraction of light at Y direction of the multilayer reflective sheet 10, and NZ is the index of refraction of light at Z direction of the multilayer reflective sheet 10 (S600); extending the multilayer reflective sheet 10 (S602); forming a surface structure 11A' on an outside surface of the multilayer reflective sheet 10 and forming a diffusion film 11B" on another outside surface of the multilayer reflective sheet 10, wherein the surface structure 11A' has a plurality of diffusion particles 110 distributed therein (S604).

Seventh Embodiment

Figure 7:
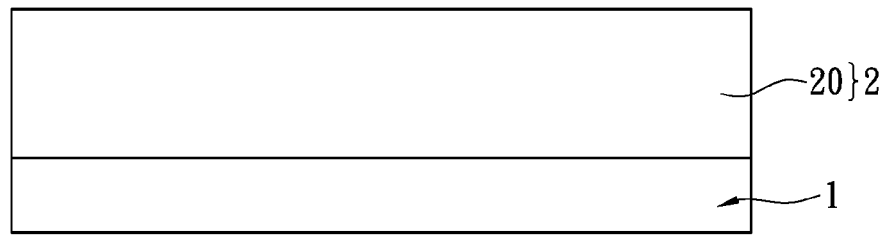
FIG. 7 shows a lateral, schematic view of the reflective light-polarizing unit applied to the image display unit according to the seventh embodiment of the instant disclosure.

Referring to FIG. 7, the seventh embodiment of the instant disclosure provides an image display device M comprising a reflective light-polarizing unit 1 and an image display unit 2. Comparing FIG. 7 with FIG. 1L, the difference between the seventh embodiment and the first embodiment is as follows: in the seventh embodiment, the reflective light-polarizing unit 1 is disposed on the bottom side of the at least one image display screen 20.

Eighth Embodiment

Figure 8:
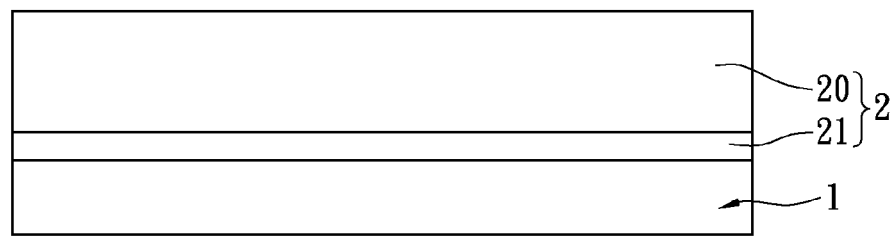
FIG. 8 shows a lateral, schematic view of the reflective light-polarizing unit applied to the image display unit according to the eighth embodiment of the instant disclosure.

Referring to FIG. 8, the eighth embodiment of the instant disclosure provides an image display device M comprising a reflective light-polarizing unit 1 and an image display unit 2. Comparing FIG. 8 with FIG. 7, the difference between the eighth embodiment and the seventh embodiment is as follows: in the eighth embodiment, the image display unit 2 includes an image display screen 20 and an absorption polarization plate 21 disposed on the bottom side of the image display screen 20 in advance, thus the reflective light-polarizing unit 1 can be disposed on the bottom side of the absorption polarization plate 21. In other words, the reflective light-polarizing unit 1 can be disposed on the bottom side of the image display unit 2.

Ninth Embodiment

Figure 9:
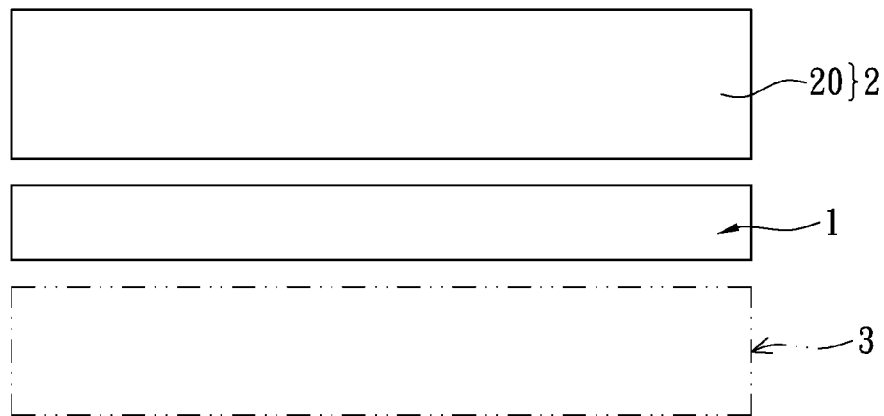
FIG. 9 shows a lateral, schematic view of the reflective light-polarizing unit applied to the image display unit according to the ninth embodiment of the instant disclosure.

Referring to FIG. 9, the ninth embodiment of the instant disclosure provides an image display device M comprising a reflective light-polarizing unit 1 and an image display unit 2. Comparing FIG. 9 with FIG. 1L, the difference between the ninth embodiment and the first embodiment is as follows: in the ninth embodiment, the reflective light-polarizing unit 1 is movably disposed between the image display screen 20 and a backlight module 3. In other words, the reflective light-polarizing unit 1 can be selectively disposed (1) on the top side of the image display unit 2 (as shown in FIG. 1L), (2) on the bottom side of the image display unit 2 (as shown in FIG. 7 and FIG. 8), or (3) between the image display screen 20 and the backlight module 3 (as shown in FIG. 9).

In conclusion, because the thicknesses of the polymer films (100A, 100B) are gradually decreased from the two outmost sides of the multilayer reflective sheet 10 to the middle of the multilayer reflective sheet 10, the thicknesses of the two polymer films (100A, 100B) on the two outmost sides are maximum in order to prevent the multilayer reflective sheet 10 from being damaged by the shearing force during the co-extrusion process. Moreover, the multilayer reflective sheet 10 has a symmetrical thickness structure, the fluid velocity and the fluid pressure in the flow channel can be balanced during the co-extrusion process.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A method of manufacturing a reflective optical film, comprising:
    feeding materials to a feedblock multiplier with thickness-gradient variation, wherein the feedblock multiplier includes a feedblock section, a plurality of channels, a segmenting section, at least two channel-switching sections, a multiplier section, and an extruding section;
    transporting the materials to the feedblock section for splitting the materials into a plurality of fluids over the channels;
    transporting the fluids over the channels to the segmenting section defining a bevel or a curved cross section configured to define a multiple of layers and render the thickness-gradient variation, and segmenting the fluids over the channels into at least two fluid segments by the bevel or the curved cross section of the segmenting section, wherein each fluid segment includes fluids segmented over the plurality of channels;
    respectively flowing the at least two fluid segments over the at least two channel-switching sections for combining the at least two fluid segments in the multiplier section, wherein the at least two channel-switching sections are used to switch a relative transportation position of the channels in each channel-switching section, and the thicknesses of the channels over the channel-switching sections have gradient variation;
    stacking up the fluids over the channels comprised in each fluid segment at the multiplier section;
    outputting the fluids over the channels stacked at the multiplier section at the extruding section for producing a multilayer reflective sheet, wherein the multilayer reflective sheet is composed of a plurality of polymer films stacked on top of one another and each polymer film has a thickness, every two adjacent polymer films are two different materials, the thicknesses of the polymer films are gradually decreased from two outmost sides of the multilayer reflective sheet to a middle of the multilayer reflective sheet, at least one of the polymer films is a birefringence material layer that conforms to the condition of NX≠NY≠NZ, wherein NX is the index of refraction of light at X direction of the multilayer reflective sheet, NY is the index of refraction of light at Y direction of the multilayer reflective sheet, and NZ is the index of refraction of light at Z direction of the multilayer reflective sheet; and
    extending the multilayer reflective sheet.

2. The method of claim 1, wherein after the step of extending the multilayer reflective sheet, the method further comprises: respectively placing a first functional layer and a second functional layer on a first surface and a second surface of the at least one multilayer reflective sheet, and then respectively placing a first substrate and a second substrate on the first functional layer and the second functional layer.

3. The method of claim 1, wherein after the step of extending the multilayer reflective sheet, the method further comprises: respectively placing a first substrate and a first functional layer on a first surface and a second surface of the at least one multilayer reflective sheet, and then respectively placing a second substrate and a second functional layer on the first functional layer and the first substrate, in order to form a reflective light-polarizing unit.

4. The method of claim 1, wherein after the step of extending the multilayer reflective sheet, the method further comprises: respectively placing a first substrate and a second substrate on a first surface and a second surface of the at least one multilayer reflective sheet, and then respectively placing a first functional layer and a second functional layer on the first substrate and the second substrate, in order to form a reflective light-polarizing unit.

5. The method of claim 1, further comprising: respectively forming two surface structures on two opposite outside surfaces of the multilayer reflective sheet, wherein each surface structure has a plurality of diffusion particles distributed therein.

6. The method of claim 1, further comprising: forming a surface structure on an outside surface of the multilayer reflective sheet, wherein the surface structure has a plurality of diffusion particles distributed therein.

7. The method of claim 1, wherein the multilayer reflective sheet has two outmost polymer films and two innermost polymer films, each outmost polymer film has a thickness which is h1, and each innermost polymer film has a thickness which is h100, and h1/h100≤3.

8. The method of claim 7, wherein h1/h100≤2.5.

9. The method of claim 7, wherein 2≤h1/h100≤2.2.

* * * * *